Aug. 12, 1952 — I. I. SIKORSKY — 2,606,728
ROTOR BLADE
Filed Dec. 4, 1945 — 2 SHEETS—SHEET 1
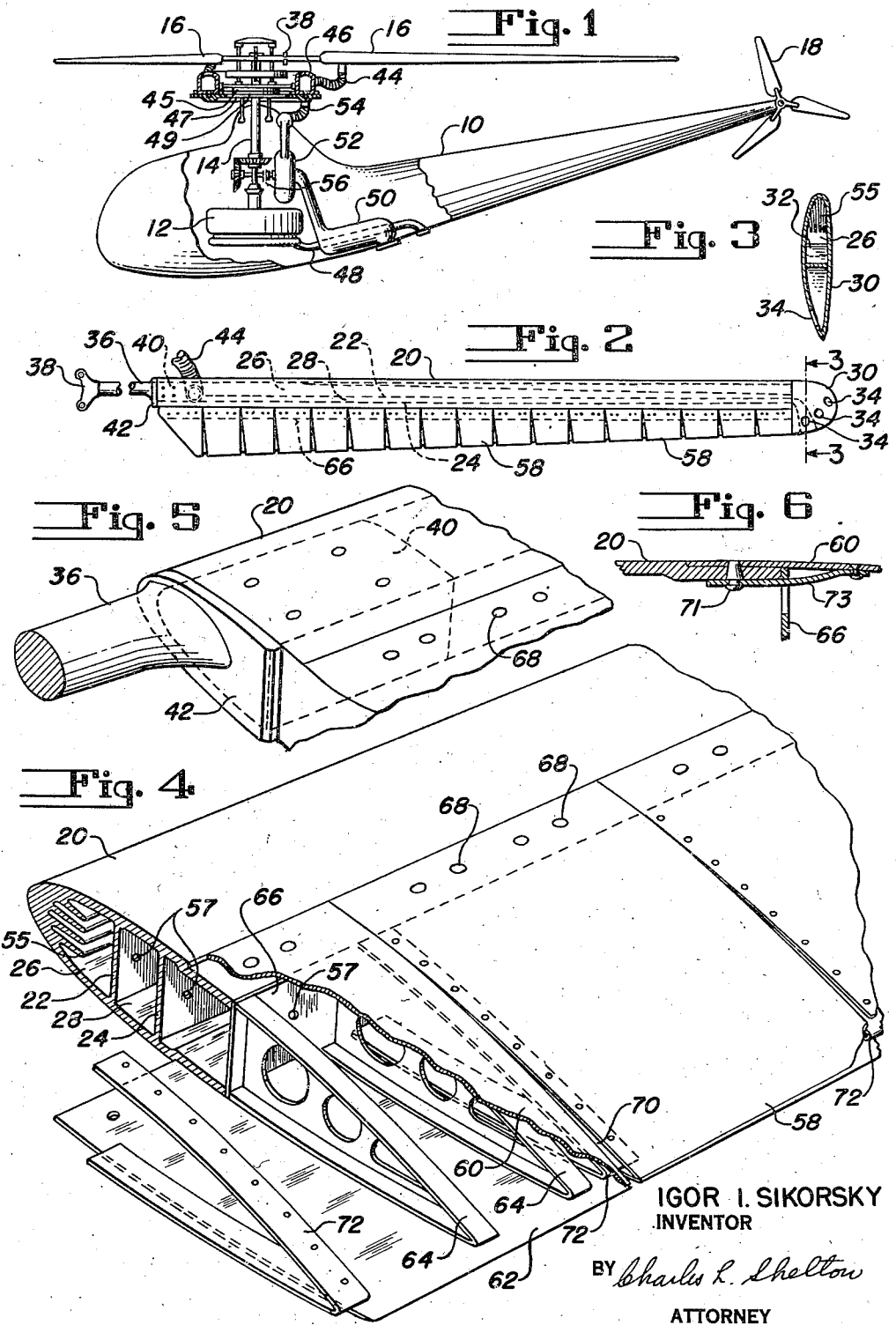
IGOR I. SIKORSKY
INVENTOR
BY Charles L. Shelton
ATTORNEY

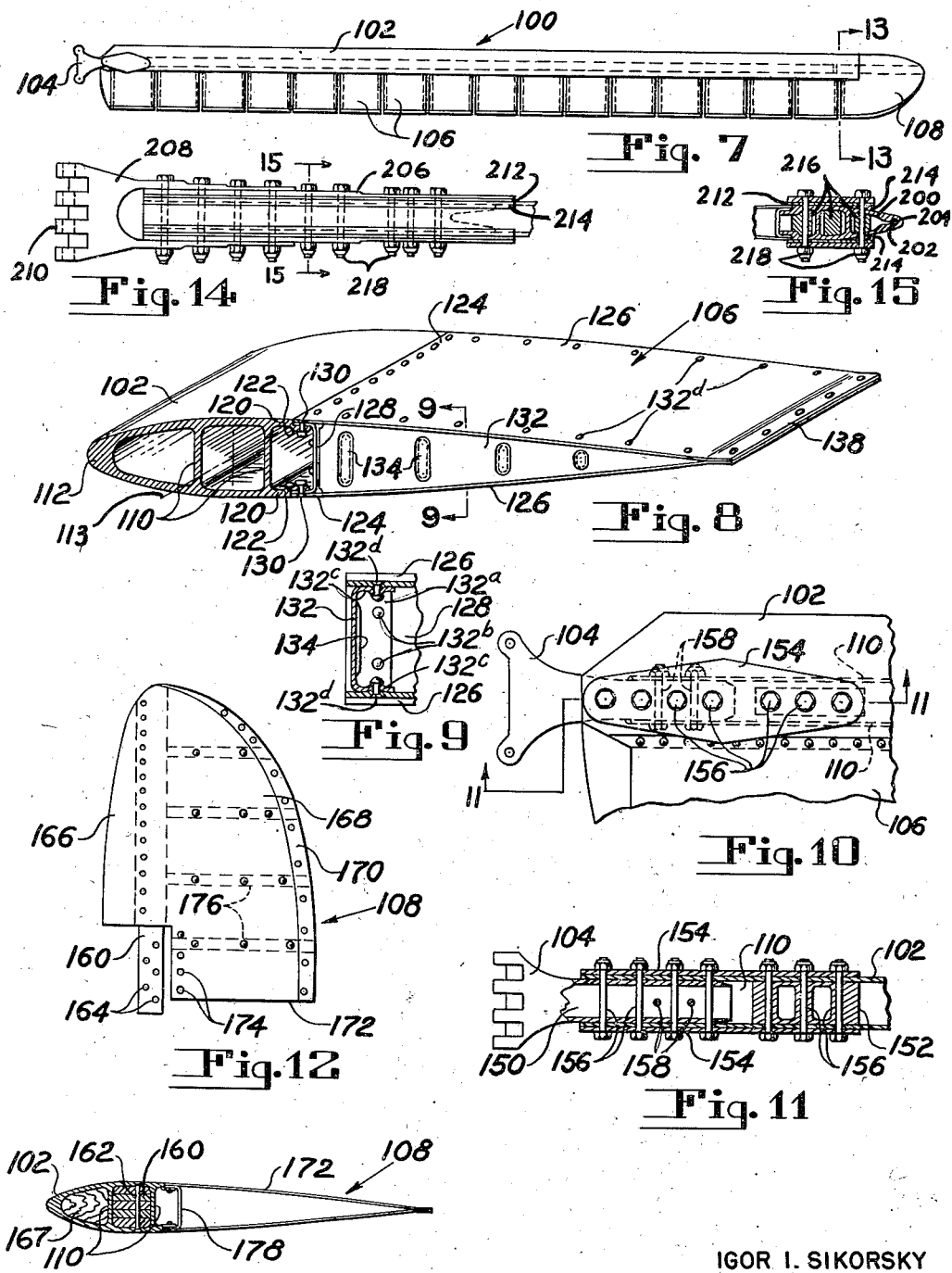

Patented Aug. 12, 1952

2,606,728

UNITED STATES PATENT OFFICE 2,606,728

ROTOR BLADE

Igor I. Sikorsky, Bridgeport, Conn., assignor to United Aircraft Corporation, East Hartford, Conn., a corporation of Delaware Application December 4, 1945, Serial No. 632,620

9 Claims. (Cl. 244—134)

This invention relates to blades and more particularly to improvements in metal rotor blades for rotary wing aircraft, and is a continuation-in-part of Patent No. 2,469,480, dated May 10, 1949, issued to the present inventor.

An object of the invention is to provide a simple, strong rotor blade.

Another object is the provision of a rotor blade having electrical heating means for preventing the formation of ice thereon.

Another object is to provide a rotor blade in which the leading edge forming member is the longitudinal strength member for the blade and has its mass distributed transversely so as to balance the blade about its feathering axis and its aerodynamic center.

A further object is to provide improved mounting means for a rotor blade as set forth in any of the preceding objects.

A still further object is to provide improved trailing section construction of interchangeable closed boxes forming segments of the trailing edge of a rotor blade.

Other objects and advantages will be apparent from the specification and claims, and from the accompanying drawings which illustrate modifications of the invention.

In the drawings:

Fig. 1 is a schematic side elevational view of a helicopter, having improved blades and means for supplying hot gas thereto.

Fig. 2 is an enlarged view of one of the rotor blades;

Fig. 3 is a section on lines 3—3 of Fig. 2;

Fig. 4 is an enlarged perspective view showing a cross section of the structural member and the details of the blade trailing edge;

Fig. 5 is an enlarged perspective view showing the method of attaching the blade support;

Fig. 6 is a detail of the trailing edge fastening;

Fig. 7 is a view similar to Fig. 2 but of a modification of this invention;

Fig. 8 is a perspective view of a portion of the presently preferred leading edge spar assembled with a box unit of the trailing edge;

Fig. 9 is a detail sectional view taken along the lines 9—9 of Fig. 8;

Fig. 10 is a partial view of the root of the rotor blade showing the means for mounting the blade portion to a connection bracket;

Fig. 11 is a sectional view taken along the lines 11—11 of Fig. 10;

Fig. 12 is a plan view of the tip of the rotor blade as it appears when removed from the blade;

Fig. 13 is a sectional view taken along the lines 13—13 of Fig. 7;

Fig. 14 is a side elevational view of another mount for the blade, and

Fig. 15 is a sectional view taken on the lines 15—15 of Fig. 14.

Referring to Fig. 1, a helicopter fuselage 10 carries an engine 12 driving a rotor shaft 14 on which are mounted rotor blades 16. An auxiliary propeller 18 is carried at one end of the fuselage 10 and may be driven by rotor shaft 14.

Each rotor blade 16 is built up of several members, including a structural member 20 forming the strength member of the blade, and also forming the leading edge thereof. The structural member 20 is preferably of uniform cross section from one end to the other and has one or more partitions 22, 24 therein dividing the member into one or more tube-like sections 26, 28 extending the length thereof. This structural member may be conveniently formed by an extrusion process, although it is not limited to such method only.

A tip-forming member 30 is secured, by welding or otherwise to one end of the structural member 20, closing that end and forming a faired blade tip, which tip 30 is provided with one or more partitions 32 dividing the same into channels connecting with channels 26, 28 of the structural member 20. Apertures 34 in the blade tip provide outlets for the chambers. A support 36 preferably having a hinge connection 38 at one end thereof, supports the structural member 20 on the rotor shaft 14. The support 36 may include a plug 40 located inside of the structural member 20 and riveted (or otherwise secured) in place. A plate 42 covers the inner end of structural member 20 and closes off any openings not otherwise closed.

The structure thus far described provides structural member 20 supported at one end by support 36 and having a tip-forming portion 30 on the other end in which channels 26, 28 extend the full length of the blade between the support and the tip, and are provided with exits 34 at the tip. A flexible conduit 44 may be utilized to conduct hot gases from the collector 46 to the interior of the structural member 20 for supplying hot gases thereto. If the structural member 20 is made of stainless steel, the hot gases may be the engine exhaust gases, but if the structural member is of aluminum, magnesium, or similar corrosive metals, in order to avoid corrosion, the hot gases may be produced by running the engine exhaust pipe 48 through a heat exchanger 50 and heating air. The exhaust gas or the heated air may be passed through a blower 52 and the flexible conduit 54 to the collector 46 and thence to the structural member 20. A clutch 56 may be provided for controlling the operation of the blower 52, as required.

In order to increase the heat absorbing area of the structural member 20 adjacent the leading edge thereof, fins 55 may be provided on the interior surface as shown in Fig. 4. These fins may be of substantially uniform size throughout the length of the blade but in the now preferred construction, they will taper so as to increase in size and area from the shank toward the tip of the blade, so as to give greater heat absorption at the blade tip where the gases will be cooler and the radiation greater (because of greater air speed of the blade tip) than at the blade shank.

The collector 46 is supported on shaft 14 and rotating plate 45 of the pitch changing mechanism. A sliding joint is provided between the collector and the flexible conduit 54. The stationary portion of the sliding joint is supported on stationary plate 47 of the pitch changing mechanism.

Small apertures 57 may be provided in the various partitions 22, 24 and 66 to permit bleeding of hot gases from one passage to another and to the interior of the trailing edge to be presently described, to give a more uniform gradation of heat and pressure over the width of the blade.

The blade section is completed by fastening V-shaped trailing edge forming members or boxes 58 to the rear portion of structural member 20. The trailing edge members are built up of sheet material forming the top portion 60 and the bottom portion 62. These sheets meet at one edge to form the blade trailing edge and are separated at the opposite edge to thereby form the V-shaped member. Ribs 64 are fastened to the sheets as by welding or riveting to reinforce and stiffen the sheets. The ribs 64 abut the plate or partition 66 secured to or forming a part of structural member 20 and the sheets 60 and 62 forming the top and bottom surfaces of the trailing edge member, overlap onto the structural member and are secured thereto by means such as rivets, screws, or spring catches 68.

A detail of one fastening means is shown in Fig. 6 in which the structural member 20 and sheet 60 are provided with registering holes and a tapered pin 71 is positioned therein by its supporting spring 73.

Sheets 60 and 62 abut adjacent sheets of the trailing edge portions on either side where they overlap the structural member but are spaced from the adjacent sheets at the trailing edge as indicated at 70. An insert of strip material 72 secured to sheets 60 and 62 of one trailing edge portion underlies the joint formed with the adjacent trailing edge portion to close the gap 70. This construction permits flexing of the structural member 20 in a fore-and-aft direction without distortion of the trailing edge. Such a construction also permits ready removal and replacement of any damaged trailing edge portion and where the blade is made of uniform width throughout, provides for interchangeability whereby one trailing edge member may be used to replace a damaged section anywhere in the length of the blade.

It has been found that under some conditions lift forces have a tendency to flex the rotor blades in a transverse direction a greater amount than is desirable. By making the blade of uniform cross section throughout the length, the additional weight in the outer portion of the blade tends, under the action of centrifugal force, to provide a blade straightening force which reduces the flexing of the blade. A blade having a uniform section therefor, in addition to providing an easily fabricated structure, also produces a blade having superior structural qualities and improved performance.

In that form of my invention shown in Fig. 7, a blade 100 is made up of a strength member 102 also for forming the leading edge and is connected with a mounting member 104 for securing the blade 100 to the rotor head of the helicopter, or the like, trailing edge boxes 106, and a tip member 108, all of which members are secured together by suitable means to be described below to form a rugged but light weight rotor blade.

As best shown in Fig. 8, the strength member 102 has a streamlined curved exterior surface and has substantially vertical longitudinal strengthening webs 110 formed integral with the material forming the major surfaces of member 102, and which form a box type spar or tubes running the entire length of the strength member 102 from the root to the tip of the blade. The tubes may conduct hot gases for de-icing purposes. The leading edge is substantially thickened and is also integral with those portions forming the upper and lower surfaces of member 102 and the strengthening webs 110. As the strength member 102 is constructed, the portion 112, the webs 110 and also those sections forming the upper surfaces of member 102 are all of relatively thick section to add strength and high fatigue resistance to the member. The thickened portion 112 at the leading edge also balances the entire blade around a centerline 113 through the tubular section formed by the webs 110, which centerline is located at approximately twenty-five per cent of the chord of the entire blade. This centerline also occurs on the feathering axis, the center of elasticity and contains the center of percussion of the blade as finally assembled. Thus, the leading edge portion 112 provides for greater strength at the leading edge so that the blade will be safe from damage in the event of striking small objects when hovering near the ground, or when in flight. The strength member 102 as constructed with the webs 110 and the arched forward section including the thickened portion 112 is highly resistive to twisting moments acting upon the blade 100 to further enhance the value of the blade so constructed. Also, the transverse moments acting upon the strength member 102 because of flapping of the blade differentially in advancing and retreating air, and the vibrations and harmonics of vibrations attendant to operation of the blade in an elastic medium, is such as to greatly reduce the stresses because the webs 110 and the leading edge 112 are integral and assume loads in the manner of a composite beam but with no joints or connections which provide points for relative motion and hence weakness in such a beam.

The strength member 102 has rearwardly extended flanges 120 provided with lips 122 forming a longitudinal shoulder for receiving built-up flanges 124 of the box-like trailing edge forming members 106. The flanges 124 are made up of extensions of the skin 126 forming the cover for the box 106 and a longitudinal press plate 128 of channel shape which has forwardly extending ears fitting into the lips 122 lying beneath the skin 126 and secured to the lips with the skin by rivets 130, or the like. The plates 128 are riveted to ribs 132, which ribs are also riveted to the skin 126. To this end ribs 132 have inturned flanges 132a overlying plates 128, which flanges are secured to plates 128 by rivets 132b, and upper and lower inturned flanges 132c which are secured to skin 126 by rivets 132d. Ribs 132 are provided with strengthening dimples 134. The upper and lower skins 126 are fastened together to form a trailing edge 138. This trailing edge forms a bendable tab of similar action to the one disclosed in U. S. Patent No. 2,473,134, issued June 14, 1949, of H. W. Bonnett, which tab may be formed by bending as required to balance aerodynamic forces acting on the blade. The adjacent boxes 106 may be in contact with each other at their forward edges where they are secured to the lips 122, and slightly spaced at their trailing edges to permit transverse blade flexing without deformation, or they may be spaced apart for the entire width about one-sixty-fourth of an inch, as shown in Fig. 7.

In Figs. 10 and 11, one means for securing the strength member 102 to the mounting member 104 is shown. The mounting member 104 is provided with a generally square sectioned extension 150 which is inserted between the box spar formed by the webs 110 into registry with bolt holes provided in the web and in the surface forming portions of the strength member 102. A spacer plug 152 formed to fit the inside of the box-like tube is inserted ahead of the extension 150 and into registry with other bolt holes. A pair of bolster plates 154 are placed on the upper and lower surfaces of the member 102 through which pass bolts 156 through holes in the plates in the strength member 102 and in the extension 150 to secure all these parts together solidly. Transverse bolts 158 pass through webs 110 and through the extension 150 to further strengthen the structure adjacent the root. All of the holes and dimensions of the bolster plates 154 are such as to not weaken any of the structure of parts to which they are attached, but rather to strengthen the same. Figs. 12 and 13, are plan and sectional views of the tip 108, also showing the method of securing it to the outer end of the blade 100. The tip 108 is built upon a wooden spar 160 which slips into the tube part formed by the webs 110 and is secured by suitable rivets or bolts 162 which pass through holes in the tip of the strength member 102 and through holes 164 of the wooden spar. The tip 108 may be made entirely of sheet metal formed into a leading edge part 166 formed over a wooden shaping block 167 and a trailing part 168, which is riveted at the trailing edge 170. The inboard end 172 of the trailing part 168 may abut the outboard trailing edge box of the blade 100 and the forward part thereof is riveted as at 174 to the strength member 102. Ribs 176 are fastened to the spar 160 and riveted to the trailing portion 168 to provide strength to the tip portion 108. A gusset 178 is fastened to the inboard end 172 of the blade tip to further strengthen the tip. By such construction and arrangement of parts, mass distribution of the tip portion can be carefully controlled to maintain the center of gravity, the center of percussion, and the center of rotation of the part in feathering substantially along the longitudinal center of the spar 160 which is a continuation of the centerline of the tube formed by the webs 110 and the surface forming parts of the strength member 102 so that the entire blade will have uniform characteristics for each unit of its length.

Figs. 14 and 15 show a second modification of the blade mounting. A third modification of the form of the blade leading edge is shown in section (Fig. 15) at its inboard end, which section is typical for any section of the strength member.

Referring in detail first to Fig. 15, a blade spar and strength member 200 is of substantially the same exterior shape as the spars described above, but has in the leading edge a groove 202 for receiving a heater wire 204 for supplying heat to the leading edge of the blade for de-icing or preventing the formation of ice upon the same. The wire 204 may be of any suitable capacity for handling loads sufficient for melting ice formation from the leading edge and far enough back from the leading edge to prevent a serious change in the weight or in the aerodynamic characteristics of the blade, in a manner well-known in the de-icing art. The spar 200 is adapted to support trailing edge forming boxes of the same kinds described above in connection with the other modifications.

The spar 200 is mounted in a step plate support comprising an inner plate 206 secured to a mounting member 208 having ears 210 for securing the same to the rotor hub. The inner plate 206 is placed against a phenolic plate 212 which in turn mates with the exterior of the spar 200 in part and with a spacer 214 fitted to the shape of the leading edge of the blade. Spacer blocks 216 are inserted inside of the spar 200 so that when bolts 218 are drawn up tight, the blade will not be deformed. By such construction of the support structure, high centrifugal loads can be safely absorbed in the support so that this modification of the invention is better adapted for larger blades than the modification previously described.

While I have shown and described different modifications of the present improved rotor blade made up around a rugged strength member in which the weight balance portions thereof are formed so as to add strength to the blade, and in which the other members for completing the blade are of rugged and durable construction, obviously, many modifications thereof will occur to those skilled in the art. For these reasons, I wish not to be limited in my invention only to those forms shown and described but by the spirit of the subjoined claims.

I claim:

1. A rotor blade for a helicopter including, a hollow longitudinal strength member having blade contour forming walls, the upper and lower walls being of a thickness to maintain stresses therein below a predetermined maximum value during operation thereof, and merging into a leading edge which is thicker to add strength and to position the transverse center of gravity of the blade, said leading edge having a spanwise recess therein, at least one strengthening web between the upper and lower walls, and a heater for de-icing said blade disposed in said recess.

2. A variable pitch rotor blade for helicopters comprising a hollow longitudinal leading edge and spar member having upper and lower blade contour forming walls merging into a common leading edge and having vertically spaced trailing edges, two spanwise extended webs connecting said upper and lower walls which are spaced chordwise from said leading and trailing edges to form a socket of uniform cross section throughout the length of said spar member which is spaced from said leading and trailing edges by spanwise extending chambers, a blade root member attached to said spar member, a blade tip member having a spar extension receivable in the outboard end of said socket, and fastening members extending through said upper and lower walls and said extension.

3. A variable pitch rotor blade for a helicopter comprising a hollow longitudinal leading edge and spar member of uniform cross section throughout its length, said spar member having upper and lower blade contour forming walls of substantial thickness terminating in vertically spaced trailing edges, two spanwise extended webs connecting the upper and lower walls of said member throughout the length of the latter and forming a box-like tube through which the longitudinal pitch changing axis of the blade extends, a blade root member having an outboard extension adapted to be fitted in the inboard end of said tube and conforming to the cross section of the latter, hollow closed boxes arranged in spanwise spaced relation along said spar member comprising V-shaped upper and lower walls having their spanwise aligned apexes forming the trailing edge of the blade and having their vertically spaced forward edges secured to said trailing edges of said spar member, and chordwise plates forming closures for adjacent ends of said blades, a blade tip member forming a closure for the outboard end of said blade having an inboard spar extension receivable in the outboard end of said tube, and fasteners extending through the upper and lower walls of said spar member and through said inboard and outboard extensions.

4. A rotor blade for helicopters including a longitudinal leading edge and spar member forming a substantial chordwise portion of the blade and having upper and lower blade contour forming walls terminating in vertically spaced trailing edges, a plurality of spanwise arranged trailing edge boxes forming the remainder of the chordwise extent of the blade having upper and lower surface members, said surface members having their forward edges spaced vertically apart and secured to the trailing edges of said spar member and having their aft edges secured together and forming the trailing edge of the blade, the adjacent boxes having their chordwise edges spaced apart, and chordwise internal closure members connected to the upper and lower surface members of each box adjacent the chordwise edges thereof and forming closed sides for said boxes.

5. A metal rotor blade for a helicopter including a longitudinal leading edge and spar extrusion, said extrusion having upper and lower blade contour forming walls comprising a substantial chordwise portion of the blade and terminating in upper and lower trailing edges, a plurality of spanwise sheet metal trailing edge boxes forming the remainder of the chordwise extent of the blade comprising upper and lower surface members having their forward edges secured to respective upper and lower trailing edges of said extrusion and having their aft edges secured integrally together and forming the trailing edge of the blade, and chordwise disposed sheet metal ribs forming closures for the sides of said boxes, said ribs having upper and lower flanges which abut the upper and lower internal surfaces of said boxes and are rigidly secured thereto.

6. A metal rotor blade for a helicopter including a longitudinal leading edge and spar extrusion, said extrusion having upper and lower blade contour forming walls comprising a substantial chordwise portion of the blade and terminating in upper and lower trailing edges, a plurality of spanwise sheet metal trailing edge boxes forming the remainder of the chordwise extent of the blade comprising upper and lower surface members having their forward edges secured to respective upper and lower trailing edges of said extrusion and having their aft edges secured together and forming the trailing edge of the blade, chordwise disposed sheet metal ribs forming closures for the sides of said boxes, said ribs having upper and lower flanges which abut the upper and lower internal surfaces of said boxes and are rigidly secured thereto, and spanwise closure members for the fronts of said boxes, each of said front closure members having flanges rigidly secured to said upper and lower surfaces of said boxes.

7. A metal rotor blade for helicopters comprising a hollow longitudinal leading edge and spar member having upper and lower walls which form a substantial chordwise portion of the blade and having a plurality of integral spanwise webs connected to said walls at points aft of the leading edge of said blade to form a load carrying spar member of substantially uniform cross section throughout the length of the blade, reinforcing plate means rigidly secured to the outer surface of said spar member at the root end thereof having reduced thickness in an outboard direction along said member, and a blade root mounting fitting having plate means overlying and rigidly secured to the inboard portion of said reinforcing plate means and to said member.

8. A metal rotor blade for helicopters comprising a hollow longitudinal leading edge and spar member having upper and lower walls which form a substantial chordwise portion of the blade and having a plurality of integral spanwise webs connected to said walls at points aft of the leading edge of said blade to form a load carrying spar member of substantially uniform cross section throughout the length of the blade, reinforcing plate means rigidly secured to the outer surface of said spar member at the root end thereof having reduced thickness in an outboard direction along said spar, a blade root mounting fitting having plate means overlying said reinforcing plate means and secured to the latter and to said spar member, and a sheet of non-metallic material interposed between said fitting and said reinforcing plate means.

9. A rotor blade for helicopters including a longitudinal leading edge and spar member forming a substantial chordwise portion of the blade and having upper and lower blade contour forming walls terminating in vertically spaced trailing edge outer surfaces, a plurality of spanwise arranged V-shaped trailing edge boxes having upper and lower walls forming the remainder of the chordwise extent of the blade, each of said V-shaped boxes having its forward vertically spaced inner surfaces secured to said outer trailing edge surfaces of said spar and having the common trailing edge of the upper and lower walls of the several boxes forming the trailing edge of the blade, the adjacent boxes having their chordwise edges spaced apart, and chordwise internal closure members connected to the upper and lower walls of each box adjacent the chordwise edges thereof and forming closed sides for said boxes.

IGOR I. SIKORSKY.

(References on following page)

REFERENCES CITED

The following references are of record in the file of this patent:

UNITED STATES PATENTS

| Number | Name | Date |
|---|---|---|
| 1,031,452 | Korf | July 2, 1912 |
| 1,317,032 | Page | Sept. 23, 1919 |
| 1,795,970 | Rohrbach | Mar. 10, 1931 |
| 1,992,338 | Whitworth | Feb. 26, 1935 |
| 2,050,327 | Howard | Aug. 11, 1936 |
| 2,108,417 | Stanley | Feb. 15, 1938 |
| 2,152,861 | Bennett | Apr. 4, 1939 |
| 2,183,158 | Bennett | Dec. 12, 1939 |
| 2,230,393 | Thomson | Feb. 4, 1941 |
| 2,320,870 | Johnson | June 1, 1943 |
| 2,330,632 | Seligman | Sept. 28, 1943 |
| 2,469,480 | Sikorsky | May 10, 1949 |

FOREIGN PATENTS

| Number | Country | Date |
|---|---|---|
| 603,100 | France | Jan. 6, 1926 |
| 807,110 | France | Oct. 12, 1936 |
| 837,466 | France | Nov. 12, 1938 |
| 311,050 | Germany | Dec. 6, 1917 |
| 303,360 | Great Britain | Nov. 7, 1929 |
| 476,597 | Great Britain | Dec. 13, 1937 |